US012681703B1

(12) United States Patent　　　　(10) Patent No.:　US 12,681,703 B1
Garg et al.　　　　　　　　　　　　(45) Date of Patent:　　　Jul. 14, 2026

(54) SEMANTIC MATCHING OF SEARCH QUERIES AGAINST A TARGET CODE

(71) Applicant: Amazon Technologies, Inc., Seattle, WA (US)

(72) Inventors: Pranav Garg, Secaucus, NJ (US); Yanjun Wang, Santa Clara, CA (US); Benjamin Robert Liblit, Leesburg, VA (US); Omer Tripp, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 18/531,352

(22) Filed: Dec. 6, 2023

(51) Int. Cl.
　　*G06F 9/44*　　　　(2018.01)
　　*G06F 8/41*　　　　(2018.01)
(52) U.S. Cl.
　　CPC ...................................... *G06F 8/42* (2013.01)
(58) Field of Classification Search
　　CPC ........................................................ G06F 8/42
　　See application file for complete search history.

(56)　　　　　　　References Cited

U.S. PATENT DOCUMENTS

| | | | | |
|---|---|---|---|---|
| 10,459,829 | B2 * | 10/2019 | Sarangapani ............. | G06F 8/43 |
| 2010/0088666 | A1 * | 4/2010 | Box ......................... | G06F 8/437 |
| | | | | 717/104 |
| 2017/0286077 | A1 * | 10/2017 | Haswell .................... | G06F 8/42 |
| 2018/0032570 | A1 * | 2/2018 | Miller ................. | G06F 16/2455 |
| 2023/0085956 | A1 * | 3/2023 | Garrote ................... | G06F 9/541 |
| | | | | 709/229 |

* cited by examiner

*Primary Examiner* — Qamrun Nahar
(74) *Attorney, Agent, or Firm* — Klarquist Sparkman, LLP

(57)　　　　　　　ABSTRACT

A search language is provided for writing rules that allow semantic and syntactic checking of source code to find potential errors in a target code. The language allows for wildcards (also called placeholders), which provide a more expansive matching of search terms. A compiler is described that converts a search language query into a semantic graph representation. The target code being searched can also be converted to a target graph representation. A comparison can then be performed between the semantic graph representation and the target graph representation to determine if the semantic graph representation is contained within the target graph representation. If so, then a semantic match is found in the target source code. More specifically, semantic matching can be realized by checking homomorphism against the target graph representation. In one example, the semantic matching can include a comparison of nodes and edges connecting the nodes.

17 Claims, 10 Drawing Sheets

FIG. 7

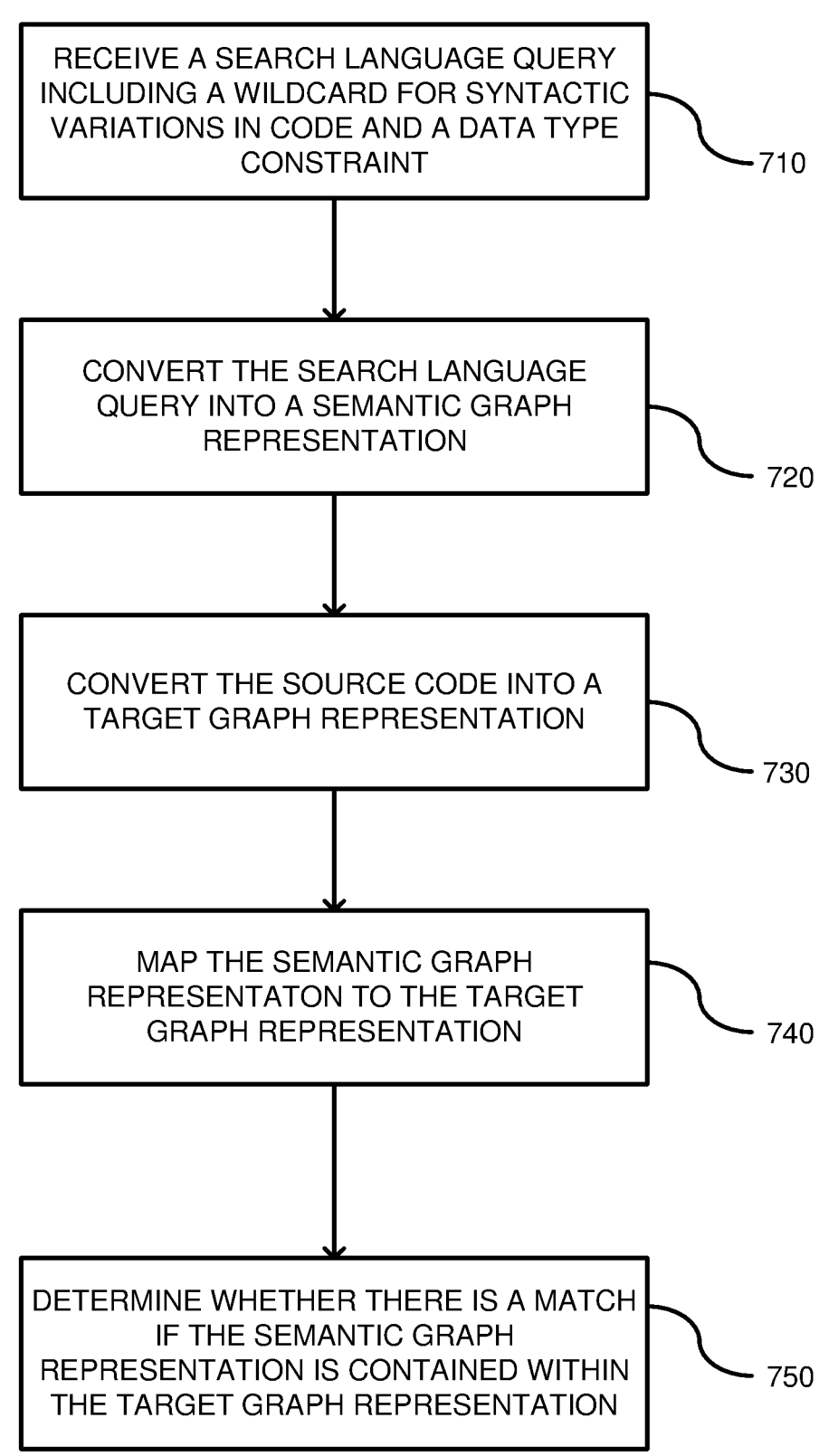

RECEIVE A SEARCH LANGUAGE QUERY INCLUDING A WILDCARD FOR SYNTACTIC VARIATIONS IN CODE AND A DATA TYPE CONSTRAINT ⟶ 710

CONVERT THE SEARCH LANGUAGE QUERY INTO A SEMANTIC GRAPH REPRESENTATION ⟶ 720

CONVERT THE SOURCE CODE INTO A TARGET GRAPH REPRESENTATION ⟶ 730

MAP THE SEMANTIC GRAPH REPRESENTATON TO THE TARGET GRAPH REPRESENTATION ⟶ 740

DETERMINE WHETHER THERE IS A MATCH IF THE SEMANTIC GRAPH REPRESENTATION IS CONTAINED WITHIN THE TARGET GRAPH REPRESENTATION ⟶ 750

FIG. 8

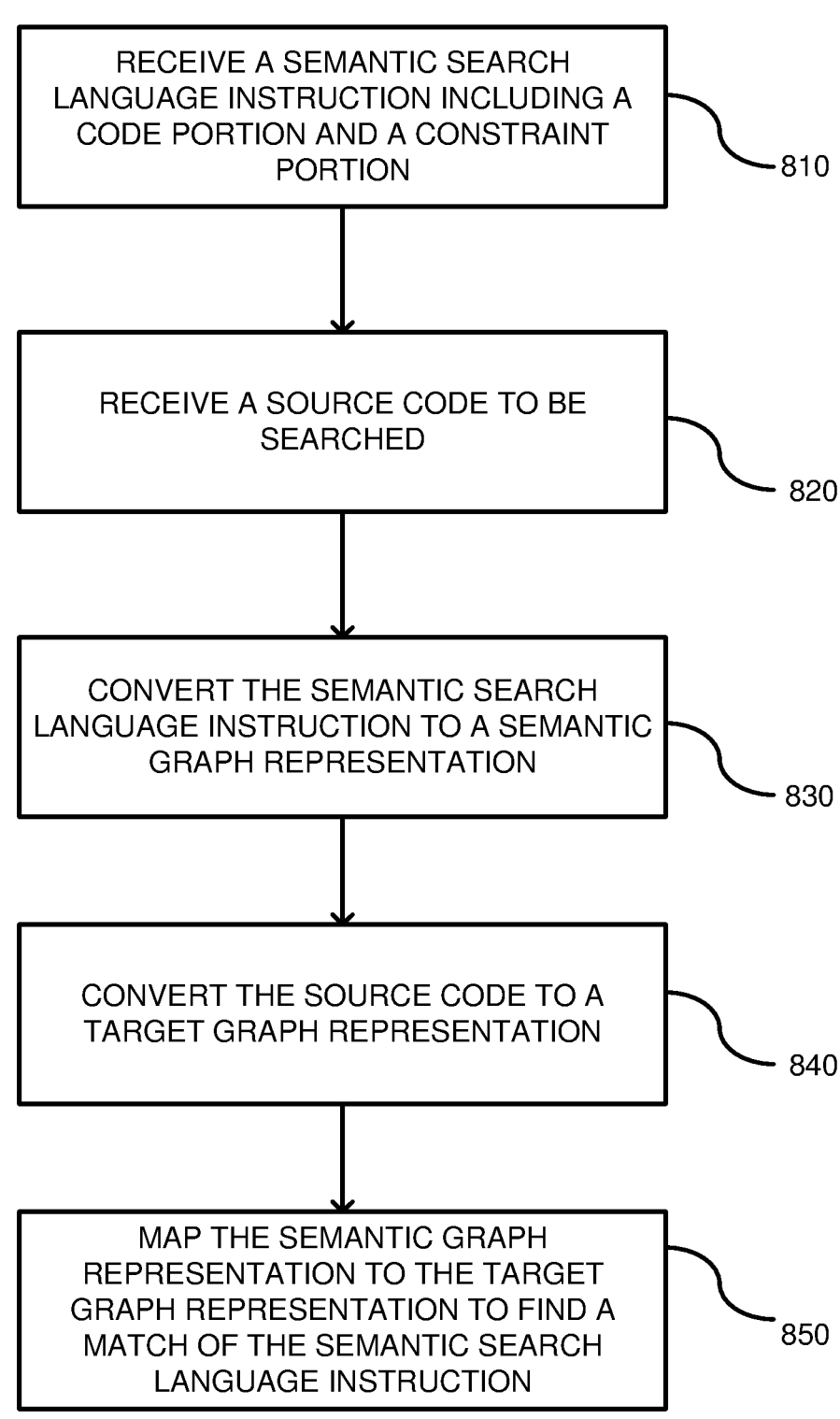

RECEIVE A SEMANTIC SEARCH LANGUAGE INSTRUCTION INCLUDING A CODE PORTION AND A CONSTRAINT PORTION — 810

RECEIVE A SOURCE CODE TO BE SEARCHED — 820

CONVERT THE SEMANTIC SEARCH LANGUAGE INSTRUCTION TO A SEMANTIC GRAPH REPRESENTATION — 830

CONVERT THE SOURCE CODE TO A TARGET GRAPH REPRESENTATION — 840

MAP THE SEMANTIC GRAPH REPRESENTATION TO THE TARGET GRAPH REPRESENTATION TO FIND A MATCH OF THE SEMANTIC SEARCH LANGUAGE INSTRUCTION — 850

FIG. 9

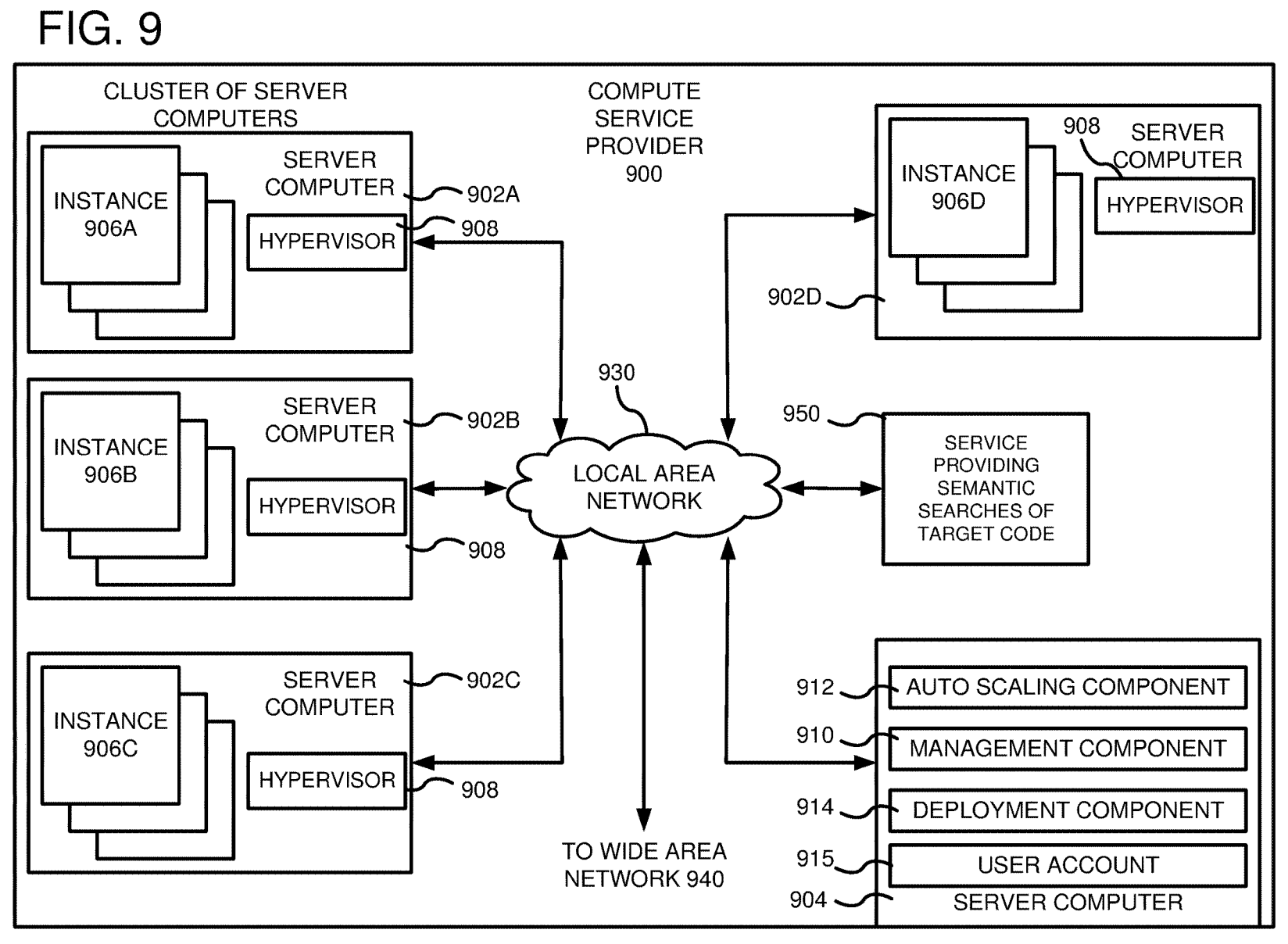

COMPUTE SERVICE PROVIDER 900

CLUSTER OF SERVER COMPUTERS

SERVER COMPUTER 902A
INSTANCE 906A
HYPERVISOR 908

SERVER COMPUTER 902B
INSTANCE 906B
HYPERVISOR 908

SERVER COMPUTER 902C
INSTANCE 906C
HYPERVISOR 908

SERVER COMPUTER 902D
INSTANCE 906D
HYPERVISOR
908

SERVICE PROVIDING SEMANTIC SEARCHES OF TARGET CODE 950

LOCAL AREA NETWORK 930

TO WIDE AREA NETWORK 940

AUTO SCALING COMPONENT 912
MANAGEMENT COMPONENT 910
DEPLOYMENT COMPONENT 914
USER ACCOUNT 915
SERVER COMPUTER 904

SEMANTIC MATCHING OF SEARCH QUERIES AGAINST A TARGET CODE

BACKGROUND

A continuous integration and continuous deployment (CI/CD) pipeline is a series of steps that can be performed in order to deliver a new version of software. CI/CD pipelines are used to improve software delivery throughout the software development life cycle. The CI/CD pipeline allows for building, testing, and deploying code through an automated process to minimize human error and maintain a consistent process for software releases. Tools that are included in the pipeline can include compilers, unit tests, code analysis, security, etc. An effective CI/CD pipeline can allow an increased rate of code releases, which can be a competitive differentiator in the software industry.

A part of the CI/CD pipeline is used for checking vulnerabilities in the source code through scans of the source code. Part of the scan testing can include syntax testing, which examines the format and the grammar of inputs and outputs in a software application. Syntax testing can also be performed to check the software for specified format and detect problematic code errors. Example code errors include correct punctuation, variable declarations, class and object declarations, etc. One limitation with syntax testing is that it requires exact matching of code, which can be difficult to determine before finding the error. More robust techniques are needed to adequately test software prior to deployment.

BRIEF DESCRIPTION OF THE DRAWINGS

FIG. 7 is a flowchart according to one embodiment for semantic matching of a search language query against target code.

FIG. 8 is a flowchart according to another embodiment for semantic matching of a search language query against target code.

FIG. 9 is an example system diagram showing a plurality of virtual machine instances running in the multi-tenant environment, in which the compiler of FIG. 1 can execute.

DETAILED DESCRIPTION

A search language is provided for writing rules that allow semantic and syntactic checking of source code to find potential errors in a target code. The language allows for wildcards (also called placeholders), which provide a more expansive matching of search terms.

A compiler is described that converts a search language query into a semantic graph representation. The target code being searched can also be converted to a target graph representation. A comparison can then be performed between the semantic graph representation and the target graph representation to determine if the semantic graph representation is contained within the target graph representation. If so, then a semantic match is found in the target source code. More specifically, semantic matching can be realized by checking homomorphism against the target graph representation. In one example, the semantic matching can include a comparison of nodes and edges connecting the nodes.

The compiler can include a front-end, which validates the syntax of the search language and normalizes the language to a standard form. The normalization can include ensuring consistent indentation (e.g., tabs or spaces), consistent parenthesis, consistent naming convention, etc. The compiler can also include a graph representation generator that generates the semantic graph representation and the target graph representation. Finally, the compiler can include an execution engine that performs the comparison between the semantic graph representation and the target graph representation. More specifically, the execution engine can use homomorphism to map between the semantic graph representation and the target graph representation to see if the semantic graph representation is fully contained within the target graph representation.

Figure 1:
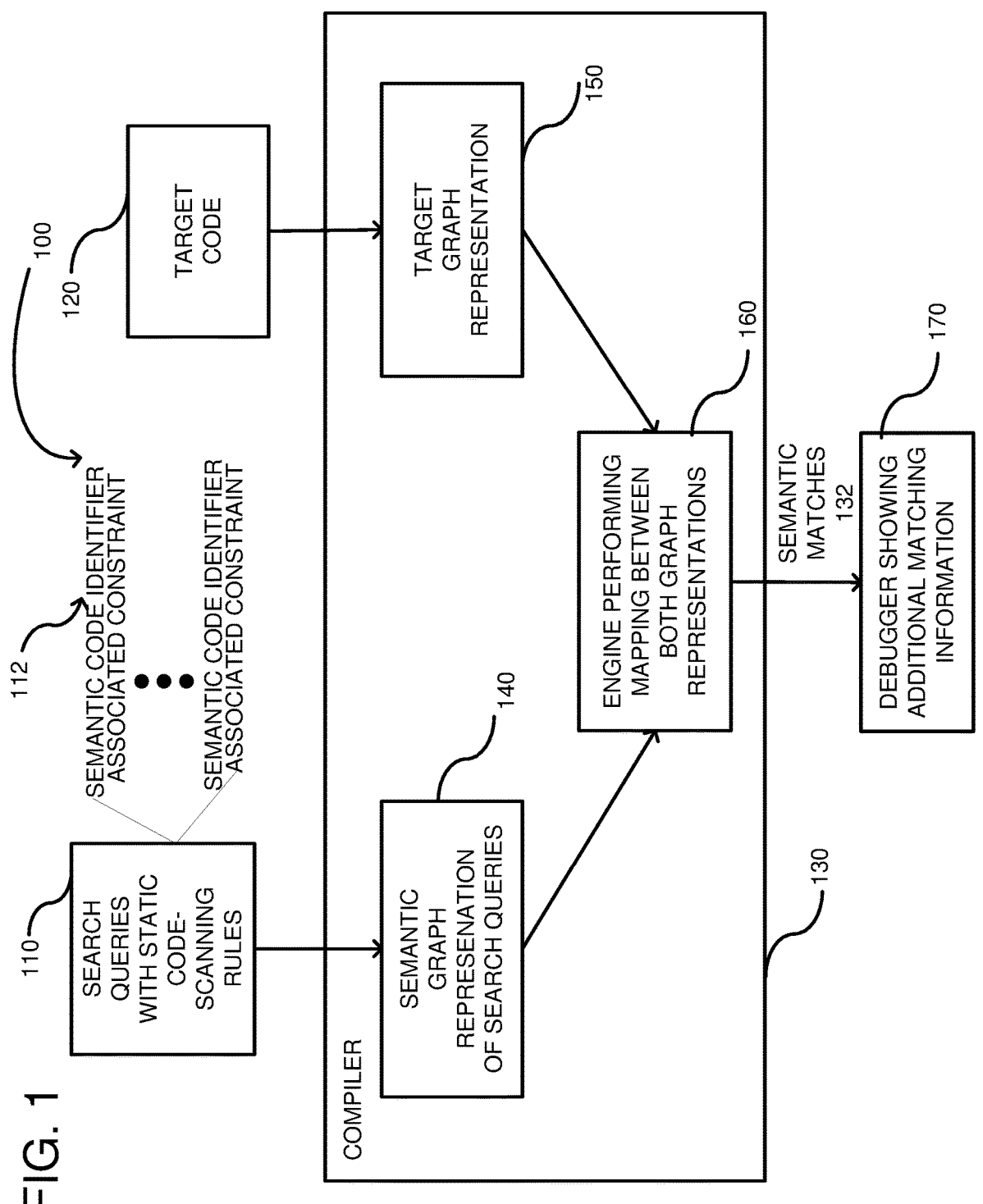
FIG. 1 is an example system diagram of a compiler used to determine semantic matches of a search language against a target code.

FIG. 1 is a system 100 for performing semantic matching of search queries on target code. One or more search queries 110 can include static code-scanning rules for performing semantic-based searching, as well as syntactic-based searching. Each search query, shown generally at 112, can include a semantic code identifier and an associated constraint. The code identifier can include a name of a software code routine (e.g., a method name) and one or more parameters associated with the software code routine. The code identifier can include wildcards or placeholders that can be used to expand searches of software code routines to semantic matches, which can include multiple syntactic variations. For example $object ( . . . ) can include the wildcard $ to indicate readobject( . . . ) and writeobject( . . . ) both are matches. Additionally, the parameters associated with the software code routine can likewise include wildcards, as indicated by the ( . . . ) above. Consequently, any parameters in the $object routine are considered matching. The associated constraint can further limit the search for the code identifier based upon a data type (i.e., a type inference), a data flow, or a value (such as a constant or literal value). The data type can be any software data type, such as integer, floating point, character, string, Boolean, etc. The data flow can describe how data moves between processes. A target code 120 can be any source code which is to be scanned using the search queries 110. Current versions of target code include python, java, C++, etc. but other software programming languages can be used. Additionally, the target code 120 can include multiple different files or multiple source codes to be searched.

A compiler 130 can receive both the search queries 110 and the target code 120 and can perform a scan using the search queries to find semantic matches 132. The compiler 130 can generate a semantic graph representation 140 of the search queries and a target graph representation 150 of the target code. As explained further below, the graph representations can include converting the queries or code into nodes and edges connecting the nodes. The wildcards can be included in the graph representation of the queries. Different models can be used including Abstract Syntax Tree (AST), Control Flow Graph (CFG), Data Flow Diagram (DFD), etc. An engine 160 can then perform a mapping between the graph representations 140, 150. More specifically, the engine 160 determines whether the nodes and edges of the semantic graph representation 140 are contained within the nodes and edges of the target graph representation 150. If so, then a matching occurs and the semantic match 132 can be indicated as a result of the search query 110. Thus, the compiler 130 can convert the search query 110 and the target code 120 into graph representations and perform a comparison between the graph representations to find semantic matches. Such a comparison can include using a homomorphism by mapping elements in the semantic graph representation 140 to elements in the target graph representation 150. The wildcards allow for matches on syntactic variations found in the target graph representation. For example, a parameter that is a wildcard in a query would indicate a match regardless of what the parameter is in the target code 120. The wildcards, therefore, allow for a more expansive and effective scan of the target code 120. The semantic matches 132 can be output to a debugger 170 that shows additional information about the matching. Specifically, matching and non-matching functions are presented to a user.

When conjoining code subpatterns that include metavariables, the debugger 170 can perform more than reporting on each subpattern in isolation. Consider the following code:

all:
    code: foo($arg)
    code: bar ($arg)

If a single target function only contains calls to foo(1) and bar (2), then that target code will match each of the two code patterns. However, it will not match the all patterns, because no single binding for $arg satisfies both conjuncts. A rule author may be confused if told that this function:

1. Does not match the all pattern on lines 1-3 of the rule.
    a. Matches the code pattern on line 2 of the rule.
    b. Matches the code pattern on line 3 of the rule.

A better result would also report the metavariable bindings that results from each match, as in:

1. Does not match the all pattern on lines 1-3 of the rule.
    a. Matches the code pattern on line 2 of the rule with $arg as 1.
    b. Matches the code pattern on the 3 of the rule with $arg as 2.

Different techniques can be used to present the results of the semantic search.

Figure 2:
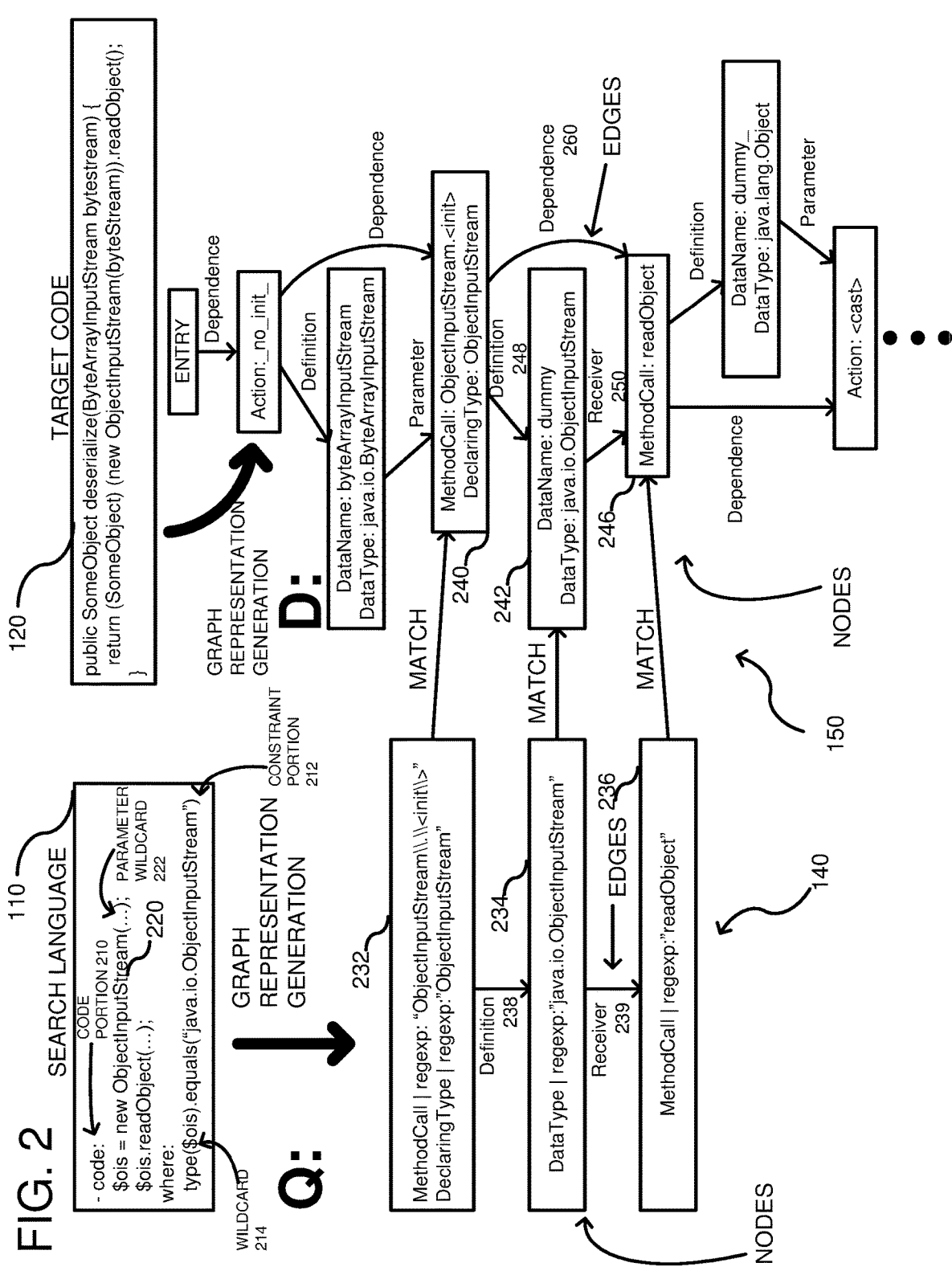
FIG. 2 is a specific example showing the search language and target language converted to graph representations in order to find a semantic match.

FIG. 2 is an example of the semantic graph representation 140 and the target graph representation 150. The search query 110 is shown having a code portion 210 and a constraint portion 212. The code portion 212 is shown having a software code routine 220, which in this example is ObjectInputStream( . . . ). The three dots are an indicator of a parameter wildcard 222. The constraint portion 212 also has a wildcard 214, shown as a $. The $ wildcard can be used at anyplace to increase the semantic search criteria. The software code routine 220 can also be changed using the wildcard. For example, $InputStream( . . . ) would include ObjectInputStream and other variations of InputStream. The search query 110 is converted to the graph representation 140 shown as three nodes 232, 234, 236. A definition edge 238 connects nodes 232 and 234, while a receiver edge 239 connects nodes 234 and 236. Node 232 relates to the method call in the code portion 210, and the node 234 relates to the data type associated with node 232. A separate method call for readobject is in node 236 and occurs after the method call defined in node 232.

The target graph representation 150 is generated from the target code 120 and includes a plurality of nodes and edges. Of particular interest are nodes 240, 242 and 246 and the edges 248, 250 between the nodes. As can be seen, the method call 232 matches the method call 240, the data type 234 matches the data type 242 and the edge 238 matches the edge 248. Likewise, node 236 matches node 246 and edge 239 matches edge 250. Thus, the nodes and edges of the graph representation 140 are contained within the graph representation 150. There can be additional edges in the graph representation 150, such as edge 260, that does not alter that the graph representation 140 is fully contained within the graph representation 150. More specifically, as long as all of the nodes and edges of graph representation 140 are present and in the same order as graph representation 150, then the semantic matching is determined. Additional nodes and edges in the graph representation 150 do not alter the matching result.

Figure 3:
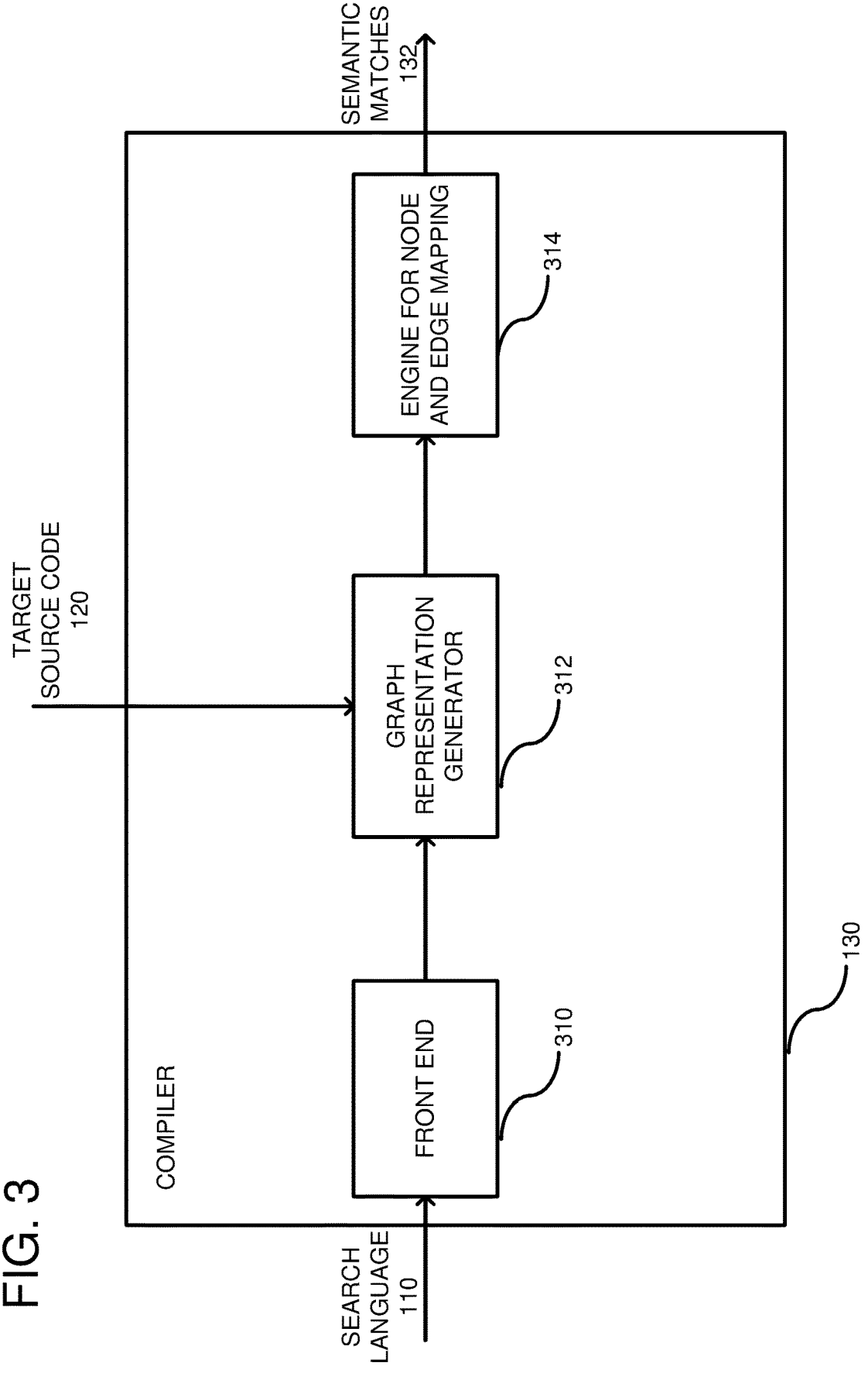
FIG. 3 shows a specific example of the compiler of FIG. 1, including a front end, a graph representation generator, and an engine for node and edge mapping.

FIG. 3 shows additional details of the compiler 130 as including a front end 310, a graph representation generator 312, and an engine 314 for mapping nodes and edges. The front end 310 is shown in more detail in FIG. 4, the graph representation generator 312 is shown in more detail in FIG. 5 and the engine 314 is shown in more detail in FIG. 6. The search language 110 enters through the front end 310, which generally checks the search language 110 for syntax and standardizes the format of the search language. After processing by the front end, the search language 110 is passed to the graph representation generator 312, which also inputs the target source code 120. Two different graph representations are generated by the generator 312 and each is transmitted to the engine 314 for performing the comparison. Other variations on the compiler 130 can be made, such as additional components being added.

Figure 4:
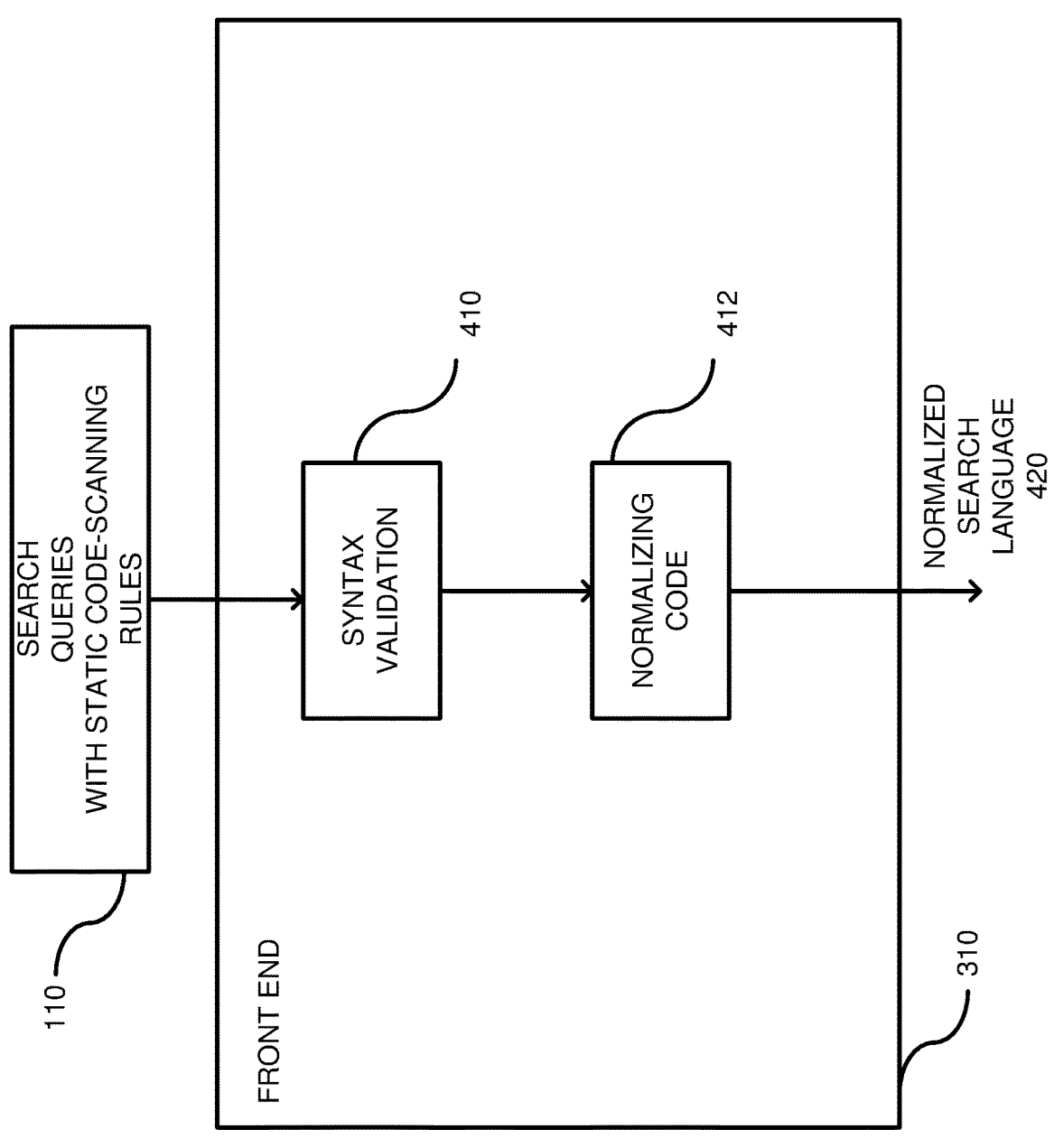
FIG. 4 shows further details of the front end of FIG. 3.

FIG. 4 shows additional details of the front end 310. The search queries 110 are received by the front end 310 and input into a syntax validation module 410 that checks whether the syntax of the search queries 110 conform to the rules for the language. The syntax errors can include misplaced punctuation, such as semicolons, parentheses, etc. Incorrect spelling, incorrect indentations and other violations of the language-based rules can also be detected. Module 412 then normalizes the search queries, such as by ensuring that formatting, spacing, commenting, etc., are consistent. The output is a normalized search language 420. The transformation to a normalized form takes the following two steps:

1. start from a root node of a rule and transform the rule into a disjunctive normal form (DNF) without simplifying any sub-formula inside a not (i.e., the negated sub-formulae, NP1 and NP2). A negated sub-formula can be present at multiple places. A determination can be made of all positive queries that are conjoined to each negated sub-formula. Positive queries can be conjoined to a negated sub-formula NP as PosQueryl through PosQueryK.

An example pattern is as follows:

all:
    any:
        code: $foo( . . . );
        code: $foo($arg);
    not:
        code: return $arg The example pattern after normalization is as follows:

any:
    all:
        code: $foo( . . . );
        not:

```
    any:
        all:
            code: return $arg
    all:
        code: $foo($arg);
        not:
            any:
                all:
                    code: return $arg
```

The problematic part of the normalized pattern should be the first "all" subpattern. This subpattern uses $arg in a negated sub-formula but does not use $arg in the corresponding positive query. However, the description given above requires that there be "two positive queries" "conjoined to a negated sub-formula" such that one of the positive queries uses the metavariable and another does not.

2. Transform each sub-formula inside the not (e.g., NP1 and NP2) into a DNF form. Updates required to the class structure representing this internal representation. The general form of the rule after the above proposed transformations will be:

$$\text{Rule} = PosQuery_1 \text{ and } \neg NP\frac{1}{1} \text{ and } \neg NP\frac{1}{2}\ldots \text{ and } \neg NP\frac{1}{k_2}$$

or $$PosQuery_2 \text{ and } \neg NP\frac{2}{1} \text{ and } \neg NP\frac{2}{2} \ldots \text{ and } \neg NP\frac{2}{k_2}$$

or wherein each NP is further simplified into DNF.

Figure 5:
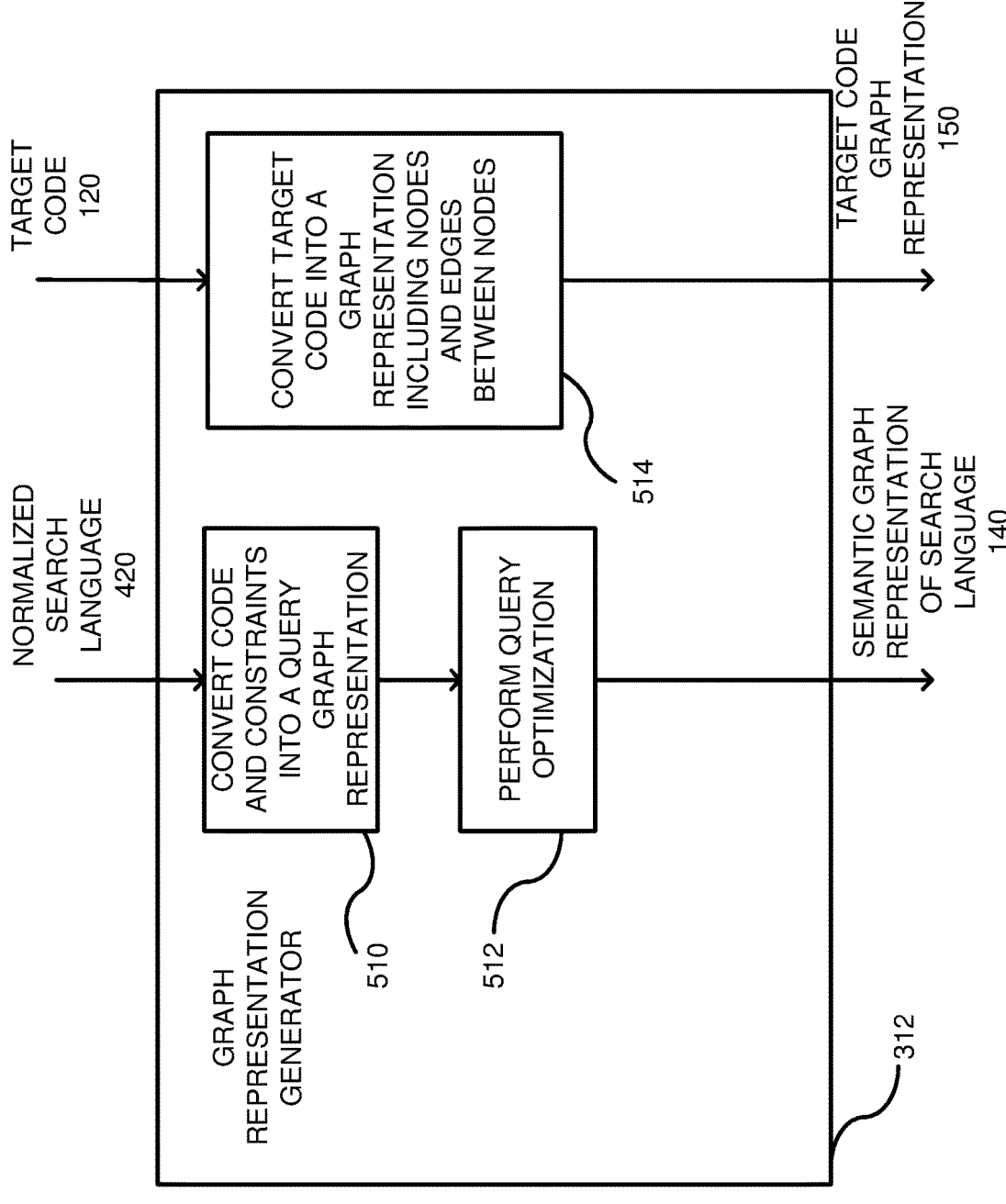
FIG. 5 shows further details of the graph representation generator of FIG. 3.

FIG. 5 shows the graph representation generator 312 in more detail. The normalized code 420 is received by module 510 that converts the code and constraints into a query graph presentation. As previously stated, a variety of conversion techniques can be used, such as Abstract Syntax Tree (AST), Control Flow Graph (CFG), Data Flow Diagram (DFD), etc. In general, various forms of semantic abstraction can be used. Module 512 can then perform query optimization on the graph. The query optimization can look for inefficiencies in the graph representation and modify the graph representation for purposes of searching. One example can be removing edges using transitive reduction that are already implied by other edges in the graph.

An example algorithm for the query optimization can be as follows:

Let G be the directed graph comprising the graph pattern
Let V be the set comprising all the nodes in graph pattern G
Let E be the set comprising all the edges in graph pattern G
For n1 in V:
children<———getChildren(n1)//get children of node n1 that
For child in children:
dfsResult<———[ ]//initialize the list that will store the result of dfs
getPreorderedNodesViaDFS(n1, dfsResult)//get a list of nodes from a pre-order D For n2 in dfsResult:
if n2==child://Exclude n1's direct children
continue
if n2) has type "DataDependentsTransformer":
E<———E\{(n1, n2)}//Remove edge (n1, n2)
The output is the semantic graph representation 140. The target code 120 is input into module 514, which converts the target code into a graph representation, similar to the search language. The target code graph representation 150 is output. Although shown in parallel, the conversions 510 and 514 can occur in series.

Figure 6:
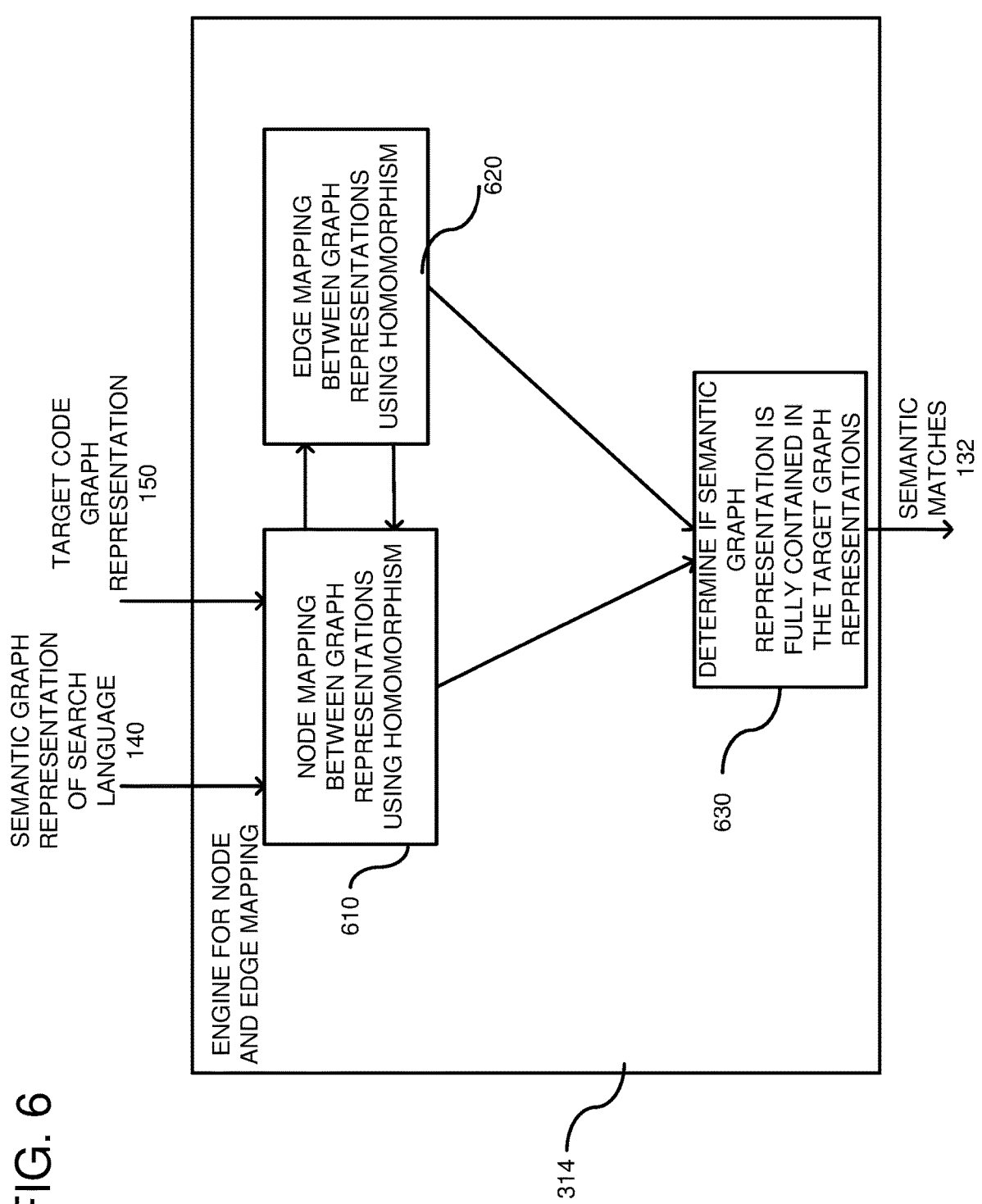
FIG. 6 shows further details of the engine of FIG. 3.

FIG. 6 shows further details of the engine for node and edge mapping. The mapping of the nodes and edges includes mapping elements in the semantic graph representation 140 to elements in the target graph representation 150. Module 610 performs node mapping between graph representations using homomorphism. Thus, for example, in FIG. 2, the node 232 is mapped to node 240 as both nodes include the same method call to ObjectInputStream. Notably, because of the wildcard 222, any parameters associated with the method call are not needed for matching. Likewise, node 234 and node 242 match for the data type. Finally, node 236 and node 246 match as for a second method ReadObject, which also has a wildcard for parameters so that parameter matching is not needed. Module 620 then performs edge matching between the graph representations 140, 150 using homomorphism. For example, in FIG. 2, the edge 238 between nodes 232 and 234 should match the edge 248 between nodes 240, 242. As both edges are a definition edge, the edges are considered matching. Likewise, edges 239 and 250 are matching. Module 610 and 620 are shown in parallel to indicate that a first node can be determined in 610, and then a first edge associated with that node in 620. Subsequently, a second node can be determined in 610 and then a second edge for that node in 620, and so on. The results of both 610 and 620 can be passed to module 630. In module 630, a determination is made if the semantic graph representation 140 is fully contained within the target code graph representation 150. If the node matching 610 is successful and the edge matching 620 is successful, then the output 132 indicates a semantic match was found. Although homomorphism is described, alternative matching algorithms can be used. In general, a mapping is performed to map node and edge elements in the semantic graph representation to elements in the target graph representation. Additionally, there can be a different order of how nodes and edges are determined.

FIG. 7 is a flowchart according to one embodiment for performing semantic analysis on source code. In process block 710, a search language query is received including a wildcard for syntactic variations in code and a data type constraint. For example, in FIG. 2, the code portion 210 includes a method call for ObjectInputStream and an associated data type 212. The wildcard 222 is in the parameter field of ObjectInputStream to allow for syntactic variations including any desired parameters. In process block 720, the search language query is converted to a semantic graph representation. For example, in FIG. 2, the semantic graph representation is shown at 140 by nodes 232, 234 and 236 and associated edges 238, 239. At 730, source code is converted into a target graph representation. For example, in FIG. 2, the source code 120 is converted into graph representation 150 including nodes and edges. In process block 740, the semantic graph representation is mapped to the target graph representation. In FIG. 2, such a mapping includes comparing that the nodes 232, 234 and 236 and edges 238, 239 are present in the target graph representation 150. In process block 750, a match is determined if all of the nodes and edges of the semantic graph representation are contained within the target graph representation, meaning that they are within the same order and without intervening nodes or edge.

FIG. 8 is a flowchart according to another embodiment for performing semantic analysis on source code. In process block 810, a semantic search language instruction is received including a code portion and a constraint portion. For example, in FIG. 1, the code portion and constraint portion are shown generically at 112. The source code identifier is within the code portion and typically is a name of a method in the target code. The method can include a wildcard as part of the name or as part or all of a parameter associated with the method. In process block 820, source code to be searched is received. For example, in FIG. 1, the source code to be searched is the target code 120 received by the compiler 130. In process block 830, the semantic search language instruction is converted into a semantic graph representation. For example, in FIG. 1, the semantic graph representation is shown at 140, which includes a plurality of nodes and edges connecting the nodes as shown in FIG. 2. In process block 840, the source code is converted to a target graph representation. For example, in FIG. 1, the target code 120 is converted to the target graph representation, as shown at 150. Finally, in process block 850, the semantic graph representation is mapped to the target graph representation to find a match of the semantic search language instruction. For example, in FIG. 1, the engine 160 can check that the semantic graph representation is fully contained within the target graph representation. If so, a semantic match 132 is identified.

FIG. 9 is a computing system diagram of a network-based compute service provider 900 that illustrates one environment in which embodiments described herein can be used. By way of background, the compute service provider 900 (i.e., the cloud provider) is capable of delivery of computing and storage capacity as a service to a community of end recipients. In an example embodiment, the compute service provider can be established for an organization by or on behalf of the organization. That is, the compute service provider 900 may offer a "private cloud environment." In another embodiment, the compute service provider 900 supports a multi-tenant environment, wherein a plurality of customers operate independently (i.e., a public cloud environment). Generally speaking, the compute service provider 900 can provide the following models: Infrastructure as a Service ("IaaS"), Platform as a Service ("PaaS"), and/or Software as a Service ("SaaS"). Other models can be provided. For the IaaS model, the compute service provider 900 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 900 using networked client devices, such as desktop computers, laptops, tablets, smartphones, etc. running web browsers or other lightweight client applications. Those skilled in the art will recognize that the compute service provider 900 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geograph area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service (s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 900 includes a plurality of server computers 902A-902D. While only four server computers are shown, any number can be used, and large centers can include thousands of server computers. The server computers 902A-902D can provide computing resources for executing software instances 906A-906D. In one embodiment, the instances 906A-906D are virtual machines. As known in the art, a virtual machine is an instance of a software implementation of a machine (i.e. a computer) that executes applications like a physical machine. In the example of virtual machine, each of the servers 902A-902D can be configured to execute a hypervisor 908 or another type of program configured to enable the execution of multiple instances 906 on a single server. Additionally, each of the instances 906 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 904 can be reserved for executing software components for managing the operation of the server computers 902 and the instances 906. For example, the server computer 904 can execute a management component 910. A customer can access the management component 910 to configure various aspects of the operation of the instances 906 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 912 can scale the instances 906 based upon rules defined by the customer. In one embodiment, the auto scaling component 912 allows a customer to specify scale-up rules for use in determining when new instances should be instantiated and scale-down rules for use in determining when existing instances should be terminated. The auto scaling component 912 can consist of a number of subcomponents executing on different server computers 902 or other computing devices. The auto scaling component 912 can monitor available computing resources over an internal management network and modify resources available based on need.

A deployment component 914 can be used to assist customers in the deployment of new instances 906 of computing resources. The deployment component can have access to account information associated with the instances, such as who is the owner of the account, credit card information, country of the owner, etc. The deployment component 914 can receive a configuration from a customer that includes data describing how new instances 906 should be configured. For example, the configuration can specify one or more applications to be installed in new instances 906, provide scripts and/or other types of code to be executed for configuring new instances 906, provide cache logic specifying how an application cache should be prepared, and other types of information. The deployment component 914 can utilize the customer-provided configuration and cache logic to configure, prime, and launch new instances 906. The configuration, cache logic, and other information may be specified by a customer using the management component 910 or by providing this information directly to the deployment component 914. The instance manager can be considered part of the deployment component.

Customer account information 915 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 930 can be utilized to interconnect the server computers 902A-902D and the server computer 904. The network 930 can be a local area network (LAN) and can be connected to a Wide Area Network (WAN) 940 so that end customers can access the compute service provider 900. It should be appreciated that the network topology illustrated in FIG. 9 has been simplified and that many more networks and networking devices can be utilized to interconnect the various computing systems disclosed herein.

A service 950 can be available in the compute service provider 900 that allows for semantic searches of target code. For example, the service 950 can offer the compiler 130 as a service and receive the search queries 110 for searching the target source code 120. The service 950 can execute on one or more of the server computers 950 or one or more instances 906.

Figure 10:
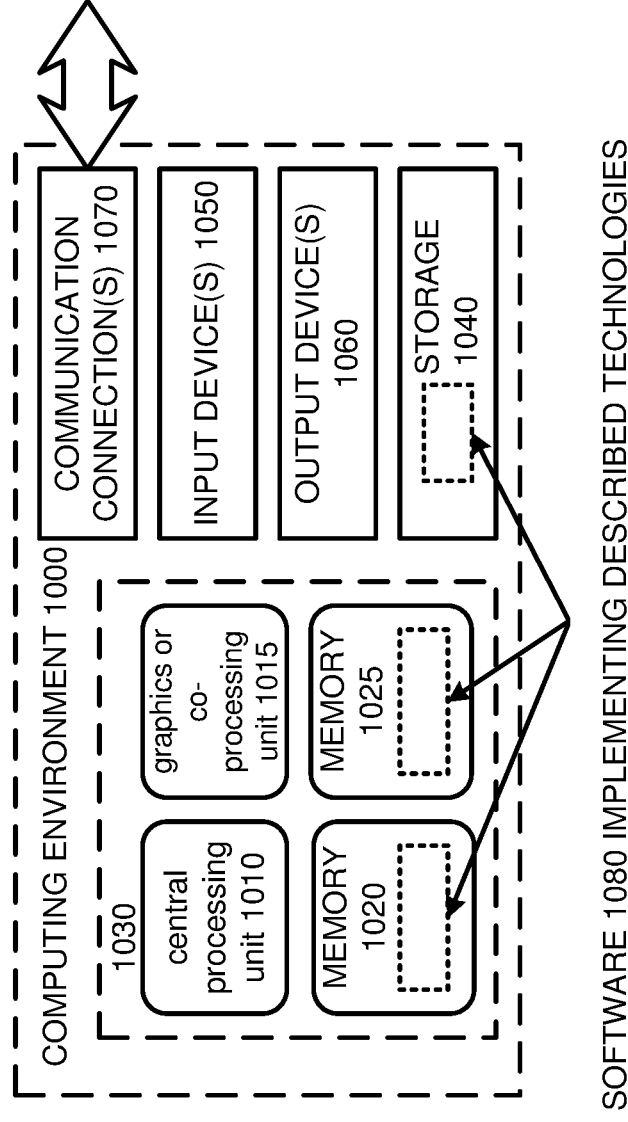
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). For example, the memory can store instructions for implementing the compiler 130 of FIG. 1.

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device (s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of performing semantic analysis on source code, the method comprising:

receiving a search language query including syntactic variations using at least one wildcard value and a data type constraint;

converting the search language query into a semantic graph representation including at least two nodes and one or more edges between the nodes;

converting the source code into a target graph representation including nodes and edges between the nodes; and mapping the semantic graph representation to the target graph representation and determining that there is a match if the semantical graph representation is contained within the target graph representation;

wherein the converting the search language query into the semantic graph representation and the converting of the source code into the target graph representation occurs within a compiler and wherein the compiler further includes a front end that validates a syntax of the search language query.

2. The method of claim 1, wherein the mapping includes using a homomorphism by mapping elements in the semantic graph representation to elements in the target graph representation.

3. The method of claim 1, wherein the wildcard is a character that can be interpreted as any number of literal characters.

4. The method of claim 1, wherein the mapping includes ensuring that the edges between the nodes match between the semantic graph representation and the target graph representation.

5. A computer system comprising a processing system and memory, wherein the computer system is configured to perform operations, comprising:

receiving a semantic search language instruction, wherein the instruction includes a search language code portion specifying, semantically, source code to be matched, and a constraint portion that further limits the search language code portion;

receiving the source code to be searched;

converting the semantic search language instruction to a semantic graph representation;

converting the source code to a target graph representation; and mapping the semantic graph representation to the target graph representation to find a match of the semantic search language instruction;

wherein the operations are performed within a compiler executing in the computer system and wherein the compiler includes a front end that validates a syntax of the semantic search language instruction.

6. The computer system of claim 5, wherein the code portion includes a wildcard value in the code to be matched so that syntactic variations of the code are matched.

7. The computer system of claim 5, wherein the mapping of the semantic graph representation to the target graph representation includes using homomorphism by mapping elements in the semantic graph representation to elements in the target graph representation.

8. The computer system of claim 5, wherein the constraint portion includes a data type constraint that the target graph representation includes to have a match.

9. The computer system of claim 5, wherein the constraint portion includes a data flow constraint or a literal value constraint that the target graph representation includes to have a match.

10. The computer system of claim 5, wherein the operations further include outputting a results of the mapping to a debugger that presents information about matches and non-matches that were determined.

11. The computer system of claim 5, wherein the semantic graph representation and the target graph representation include nodes and edges between the nodes and wherein the mapping includes matching the nodes and the edges.

12. A method, comprising:

receiving a semantic search language instruction having a search language code portion including a programming instruction to search on, wherein the search language code portion includes at least one wildcard that is a parameter of the programming instruction or within the programming instruction, wherein the semantic search language instruction includes a constraint;

receiving a target source code to be searched; and matching the semantic search language to the target source code using a homomorphism, wherein the receiving of the target source code and the matching of the semantic search language to the target source code occur within a compiler and wherein the compiler validates a syntax of the search language instruction.

13. The method of claim 12, wherein the matching includes mapping elements in a semantic graph representation to elements in a target graph representation.

14. The method of claim 12, wherein the matching includes converting the semantic search language instruction into a semantic graph representation and converting the target source code into a target graph representation and then determining whether the semantic search language instruction is contained within the target graph representation.

15. The method of claim 14, wherein the semantic graph representation and the target graph representation include nodes and edges and the matching includes comparing the nodes and edges of the semantic graph representation to the nodes and edges of the target graph representation.

16. The method of claim 12, wherein the wildcard allows syntactic variations in the target source code to match the semantic search language instruction.

17. The method of claim 12, wherein the constraint is a data type and the data type further limits the code portion.

* * * * *